(12) United States Patent
Smail

(10) Patent No.: US 12,678,962 B2
(45) Date of Patent: Jul. 14, 2026

(54) AUTONOMOUS ROBOTS FOR DETECTING LEAKS

(71) Applicant: The ADT Security Corporation, Boca Raton, FL (US)

(72) Inventor: David Smail, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 212 days.

(21) Appl. No.: 18/747,879

(22) Filed: Jun. 19, 2024

(65) Prior Publication Data

US 2026/0042218 A1      Feb. 12, 2026

Related U.S. Application Data

(63) Continuation of application No. 18/514,411, filed on Nov. 20, 2023, now Pat. No. 12,042,943.

(51) Int. Cl.
| | |
|---|---|
| *B25J 9/16* | (2006.01) |
| *B25J 5/00* | (2006.01) |
| *B25J 11/00* | (2006.01) |

(52) U.S. Cl.
CPC ............. *B25J 9/1694* (2013.01); *B25J 5/007* (2013.01); *B25J 9/1679* (2013.01); *B25J 11/008* (2013.01)

(58) Field of Classification Search
CPC ........ B25J 9/1694; B25J 5/007; B25J 9/1679; B25J 11/008
See application file for complete search history.

(56) References Cited

U.S. PATENT DOCUMENTS

| | | | |
|---|---|---|---|
| 9,772,612 B2 | 9/2017 | McCarthy, III et al. | |
| 10,514,704 B2 | 12/2019 | Bakhishev et al. | |
| 11,197,597 B2 | 12/2021 | O'Brien et al. | |
| 2018/0344114 A1 | 12/2018 | Scholten et al. | |
| 2019/0112171 A1 | 4/2019 | High et al. | |
| 2020/0264621 A1 | 8/2020 | Tiwari et al. | |
| 2020/0315421 A1* | 10/2020 | Kung ..................... | G08B 21/02 |
| 2021/0094686 A1 | 4/2021 | Metzner et al. | |

* cited by examiner

*Primary Examiner* — Basil T. Jos

(74) *Attorney, Agent, or Firm* — Weisberg I.P. Law, P.A.

(57) ABSTRACT

A system comprising a robot and a robot base station is described. The processor of the robot base station is configured to receive information about a potential water leak and cause transmission of a first command to cause the robot to traverse an area associated with the potential water leak. The processor of the robot is configured to receive the first command from the robot base station, cause the robot to traverse the area associated with the potential water leak, and determine, using at least a sensor, that a liquid corresponding to the potential water leak is present in the area. Further, the processor of the robot is further configured to determine information about the liquid and cause transmission of a first indication to the robot base station, where the first indication indicates that the liquid is present in the area and the information about the liquid.

20 Claims, 11 Drawing Sheets

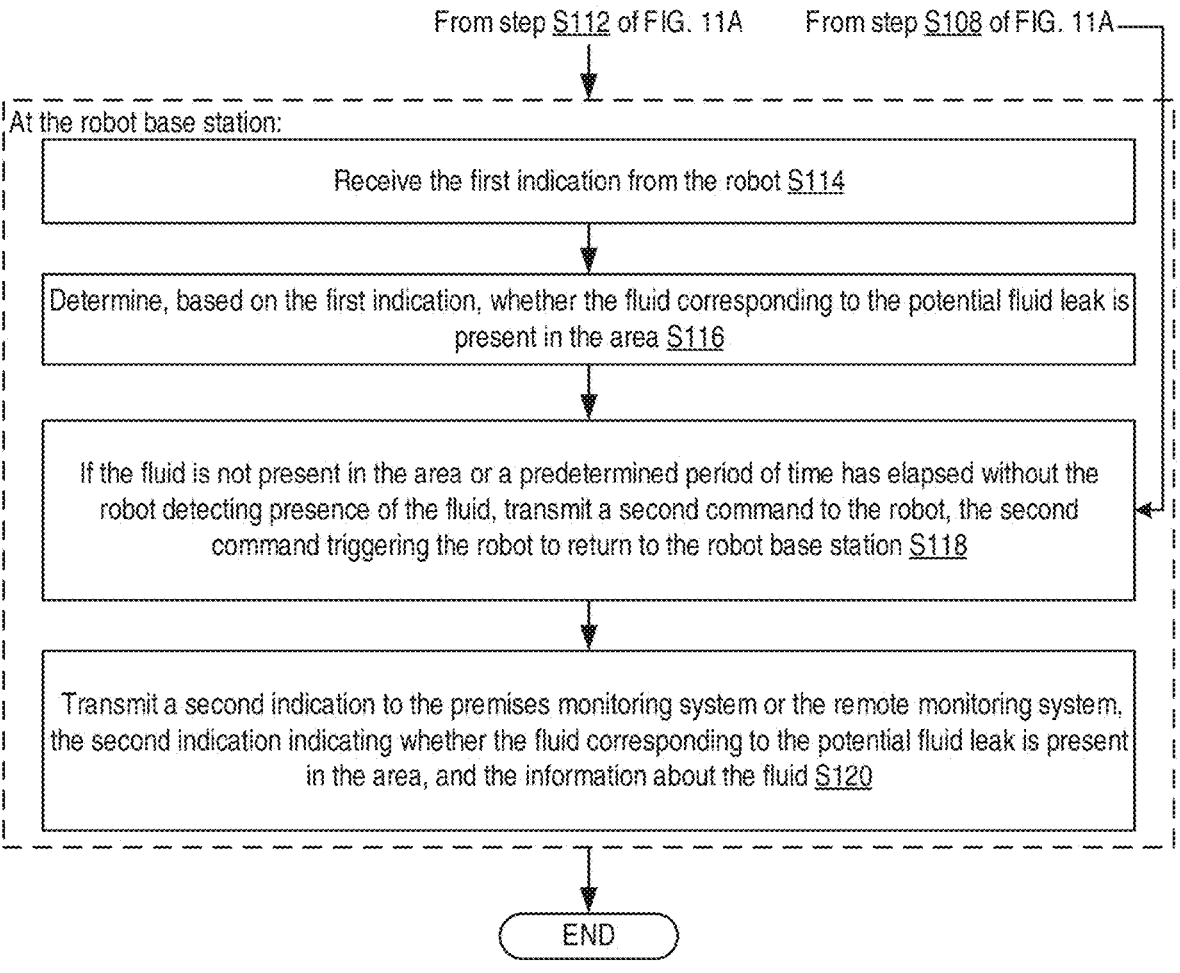

From step S112 of FIG. 11A          From step S108 of FIG. 11A

At the robot base station:

Receive the first indication from the robot S114

Determine, based on the first indication, whether the fluid corresponding to the potential fluid leak is present in the area S116

If the fluid is not present in the area or a predetermined period of time has elapsed without the robot detecting presence of the fluid, transmit a second command to the robot, the second command triggering the robot to return to the robot base station S118

Transmit a second indication to the premises monitoring system or the remote monitoring system, the second indication indicating whether the fluid corresponding to the potential fluid leak is present in the area, and the information about the fluid S120

END

FIG. 11B

AUTONOMOUS ROBOTS FOR DETECTING LEAKS

CROSS-REFERENCE TO RELATED APPLICATIONS

This application is a Continuation of and claims priority to U.S. Utility patent application Ser. No. 18/514,411, filed Nov. 20, 2023, entitled AUTONOMOUS ROBOTS FOR DETECTING LEAKS, the entirety of which is incorporated herein by reference.

TECHNICAL FIELD

The present technology is generally related to robots arranged for detecting fluid leaks and/or fluids.

BACKGROUND

Typically, a premises such as a home, an office building, an industrial facility, etc., has piping that delivers water, such as potable water for human consumption, or directs wastewater away from the premises for treatment. In some cases, fluid leaks resulting from damaged piping, incorrect fittings, or deteriorating pipe joints or valves may cause damage to property. In some other cases, damage to the property is caused by roof leaks, floods, or other events.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 11B is a flowchart depicting additional steps of the example of functionality performed by components of the system of FIG. 1 according to some embodiments of the present disclosure.

DETAILED DESCRIPTION

The present disclosure relates to robots configured for detecting fluids, which may be indicative of leaks in premises.

Robots, such as household autonomous robots, can operate within a premises and perform various tasks, such as vacuuming, mopping, recording audio or video, etc. In some embodiments of the present disclosure, a robot is equipped with a sensor for detecting fluids in a premises. In some other embodiments, the robot may perform fluid detection activities while it performs other activities (e.g., vacuuming), or it may be deployed to investigate a potential fluid leak that has been detected by another device. For example, if the robot has vacuuming capabilities, the autonomous robot may continuously or periodically or randomly use its fluid sensor(s) to determine whether fluid is on the floor of the area being vacuumed. Alternatively, the autonomous robot may initiate fluid detection actions in response to other events, such as: (1) the presence of a fluid leak being detected based on video, water, or other sensor data; or (2) a command from a user.

Nonlimiting examples of autonomous robots may include robot vacuums, robot mops, and any other type of mobile robot that can move, for example, within an interior environment of a premises, such as a home or building. The autonomous robots may be capable of navigating within a home or other building, avoiding obstacles and hazards (e.g., avoiding falling downstairs), returning to a robot base station for battery charging, etc.

Figure 1:
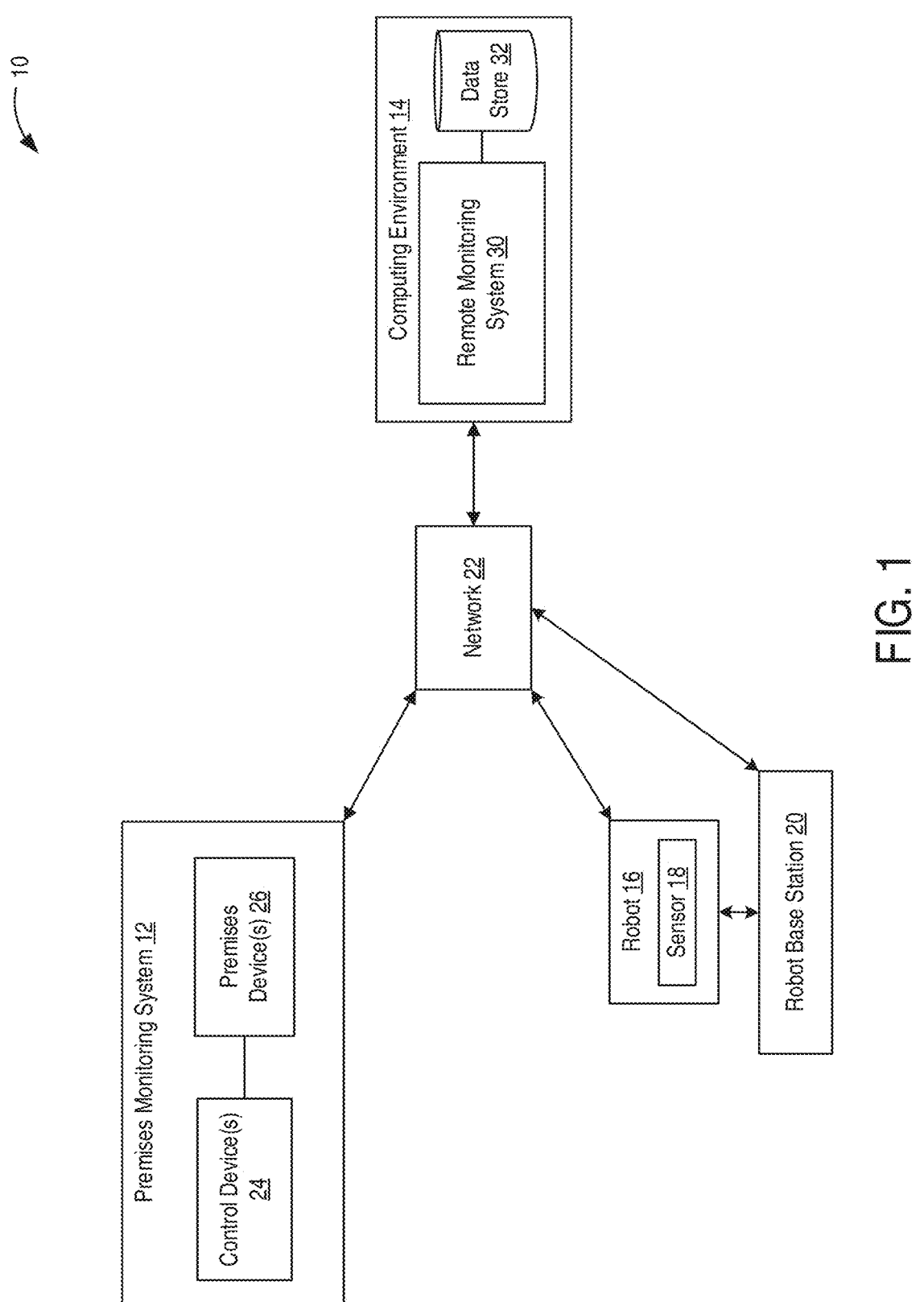
FIG. 1 is a block diagram of an example system according to some embodiments of the present disclosure.

With reference to FIG. 1, shown is a block diagram of an example system 10 according to some embodiments of the present disclosure. System 10 may comprise premises monitoring system 12, computing environment 14, robot 16 including sensor 18, robot base station 20, and network 22. In some embodiments, system 10 comprises more than one premises monitoring system 12. Each premises monitoring system 12 comprises at least one control device 24 and at least one premises device 26. Computing environment 14 comprises remote monitoring system 30 and data store 32.

Any of the components of system 10 may be configured to communicate with any other component(s) of system 10. For example, robot 16 and robot base station 20 may be configured to communicate with premises monitoring system 12 and/or control device 24 and/or premises device 26, computing environment 14, remote monitoring system 30, and data store 32, such as via network 22 or directly.

Network 22 can include, for example, one or more intranets, extranets, wide area networks (WANs), local area networks (LANs), wired networks, wireless networks, satellite networks, Data Over Cable Service Interface Specification (DOCSIS) networks, cellular networks, Plain Old Telephone Service (POTS) networks, and/or other types of networks. Network 22 may support one or more communication protocols, one or more wired communication links, one or more wireless communication links, etc.

Premises monitoring system 12 may be configured to provide functionality relating to premises monitoring. As examples, premises monitoring system 12 may be used to detect burglaries, smoke, fires, carbon monoxide leaks, water leaks, etc. and report detected events to remote monitoring system 30. Additionally, the premises monitoring functionality performed by premises monitoring system 12 may include home automation functionality. Examples of home automation functionality include thermostat control, door lock control, lighting control, appliance control, entertainment system control, etc.

Control device 24 may be configured to control various aspects of premises monitoring system 12. For example, control device 24 may be configured to control premises devices 26, such as locks, doors, windows, actuators, valves (e.g., water shutoff valves), motors, and any other controllable devices associated with premises monitoring system 12. Control device 24 may include a user interface, such as buttons, a touch screen, a display, a microphone, a speaker, and/or other types of user interface components, to facilitate a user interacting with and controlling premises monitoring system 12. According to various embodiments, control device 24 may be, or include, a wall-mountable panel device (e.g., a wall-mounted alarm system panel), a tabletop panel device (e.g., a tabletop alarm system panel), a gateway device, a hub, a keypad, a remote control, and/or another type of device configured to control aspects of premises monitoring system 12.

In some embodiments, control device 24 may be configured to receive from robot 16 or robot base station 20 an indication of a detected fluid and perform at least one action in response to the indication of the fluid. The action may include a mitigating action, such as causing a valve that may be causing a leak corresponding to the fluid to close. When the valve closes, the fluid stops flowing to the discharge side of the valve, thereby causing the leak to stop. The valve may be a shutoff valve or any other type of valve. Further, control device 24 may confirm a leak, detect a leak, or cause a premises device 26 to confirm or detect a leak in the premises, e.g., using image, video, and/or audio capture by premises device 26; flood detection alarms triggered by premises device 26; etc. A leak may include a liquid or gas leak. A leak of a liquid may include a water leak, an acid leak, an oil leak, etc. In some cases, a gas leak may result in an accumulation of a liquid on the floor or other parts of the premises. In addition, control device 24 and/or computing environment 14 may be configured to obtain, store, and transmit premises data, which may include records or data associated with the premises. The records may include records associated with fluid usage, such as water consumption, records comprising information about the premises monitoring system 12 (e.g., system status, system configuration, account information, location information, information about premises devices 26, etc.), and any other type of records. Data associated with premises device 26 may include real-time sensor data or historical sensor data.

Premises device 26 may include sensors; devices configured to capture audio, images, and/or video; and/or other devices. For example, premises devices 26 may include motion sensors, fire sensors, smoke sensors, heat sensors, carbon monoxide sensors, flood sensors, flow sensors, level sensors, temperature sensors, humidity sensors, proximity sensors, contact sensors, glass break sensors, water consumption sensors, water pressure sensors, etc. Devices configured to capture audio, images, and/or video may be referred to as media devices and may include still image cameras, video cameras, microphones, etc. Additional examples of premises devices 26 include sirens, garage door controllers, doorbells, temperature sensors, humidity sensors, lighting devices, switches, electrical outlets, and electrical plugs.

Further, one or more premises devices 26 may be configured to transmit a notification of a potential leak to robot

16 or any other component of system 10 and cause robot 16 to investigate the potential leak. For example, a premises device 26 may detect water accumulation on the floor of a room of the premises in video of the room. In response to detecting the water accumulation, premises device 26 may transmit a notification of the detected water accumulation to robot 16 or control device 24 to cause the robot 16 to travel to the room and initiate fluid detection using sensor 18.

Remote monitoring system 30 of computing environment 14 may be configured to provide remote monitoring services for multiple premises monitoring systems 12. For example, in the event that an open door, open window, glass break, etc. is detected by a premises device 26 when a premises monitoring system 12 is in an armed state, the premises monitoring system 12 may transmit an alarm signal to remote monitoring system 30. In response, an agent associated with remote monitoring system 30 may notify first responders, such as police, fire, emergency medical responders, etc., and/or one or more designated users associated with the premise monitoring system 12.

Remote monitoring system 30 of computing environment 14 may be configured to communicate with robot 16 and robot base station 20 and collect data associated with fluid detection performed by robot 16, status information associated with robot 16, etc. Remote monitoring system 30 may also cause robot 16 to perform actions such as fluid detection. In addition, remote monitoring system 30 may collect data from control device 24 and premises device 26 and cause control device 24 and premises device 26 to perform an action that may be related to fluid detection, confirmation, and/or damage mitigation. In some embodiments, remote monitoring system 30 may perform monitoring-based functions. For example, if a fluid, leak, or impending leak is detected by robot 16 and/or premises devices 26, remote monitoring system 30 may transmit a notification to a devices associated with a homeowner, tenant, neighbor, or other designated persons.

Data store 32 may at least temporarily store data for retrieval, management and/or analysis. In particular, data store 32 may be configured to at least temporarily store content associated with premises monitoring system 12, computing environment 14, robot 16, and robot base station 20. As examples, the data stored in the data store 32 can include, but is not limited to, fluid information, leak information, multimedia data, records, robot data, robot base station data, sensor data, data associated with premises monitoring system 12, and other types of data.

Robot 16 may be an autonomous robot configured to operate within a premises and perform various tasks. For example, robot 16 may include sensor 18 configured to detect fluid or a fluid condition, such as a leak, and transmit a notification indicating the detected fluid and/or fluid condition to premises monitoring system 12 or computing environment 14. Sensor 18 may be coupled to any component of the robot or located at any location of the robot 18. For example, sensor 18 may be in the front, rear, top, bottom, or any side of the robot (or body of robot 16). The notification may include information usable by any component of premises monitoring system 12 to address the leak or by remote monitoring system 30 or a user of remote monitoring system 30 to alert a person associated with the premises.

Robot base station 20 may communicate with any component of system 10, such as premises monitoring system 12, computing environment 14, and robot 16, to perform one or more functions of the present disclosure. For example, robot base station 20 may receive information about a potential leak from premises monitoring system 12 or computing environment 14 and cause robot 16 to initiate fluid detection actions. Further, robot 16 may dock with robot base station 20 for the purposes of charging, cleaning, etc. For example, robot base station 20 may be powered by a premises power source, such as a power outlet. Robot 16 may include rechargeable batteries used by robot 16 to power electric motors for the purposes of traveling across rooms, vacuuming, mopping and performing other functions. Robot 16 may dock to robot base station 20 for charging the batteries.

Robot 16 may initiate fluid detection actions based on a schedule, signaling received from the robot base station 20, signaling received from other components of system 10, etc. When robot 16 initiates fluid detection actions, robot 16 may undock from robot base station 20, activate sensor 18, and move throughout several areas of the premises. After performing fluid detection actions, robot 16 may return to robot base station 20 for one or more of charging, cleaning, emptying dirt and/or fluid reservoirs, downloading and/or uploading information collected by sensor 18 to robot base station 20, etc. In some embodiments, robot base station 20 may transmit notifications including robot status information, data associated with the detection of fluids, data associated with the robot base station 20, etc. Robot base station 20 may also prepare robot 16 for fluid detection, such as by cleaning and/or clearing sensor 18 of robot 16, etc. For example, cleaning and/or clearing sensor 18 may comprise removing fluid from sensors 18, such as by one or more of causing the sensors 18 to rotate at a predetermined speed, energizing a fan that blows air to the sensors, wiping sensors 18 on a dry material, etc.

Figure 2:
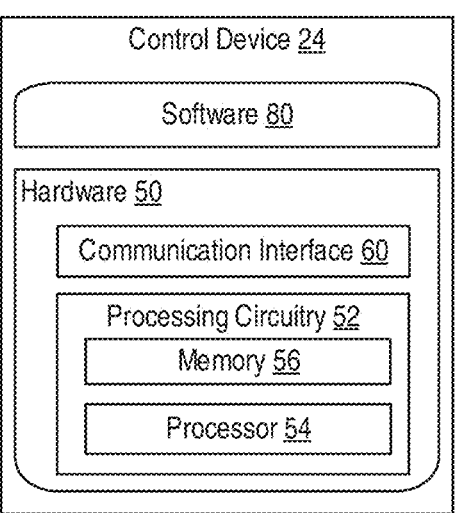
FIG. 2 is a block diagram of an example control device of the system of FIG. 1 according to various embodiments of the present disclosure.

Referring to FIG. 2, shown is a block diagram illustrating an example control device 24 of premises monitoring system 12. As shown, control device 24 comprises hardware 50. The hardware 50 may include processing circuitry 52. The processing circuitry 52 may include one or more processors 54 and one or more memories 56. Each processor 54 may include and/or be associated with one or more central processing units, data buses, buffers, and interfaces to facilitate operation. In addition to or instead of a processor 54 and memory 56, the processing circuitry 52 may comprise other types of integrated circuitry that perform various functionality. Integrated circuitry may include one or more processors 54, processor cores, field programmable gate arrays (FPGAs), application specific integrated circuits (ASICs), graphics processing units (GPUs), Systems on Chips (SoCs), or other components configured to execute instructions. The processor 64 may be configured to access (e.g., write to and/or read from) the memory 56, which may comprise any kind of volatile and/or nonvolatile memory, e.g., cache, buffer memory, random access memory (RAM), read-only memory (ROM), optical memory, and/or erasable programmable read-only memory (EPROM). Further, memory 56 may be embodied in the form of one or more storage devices. The processing circuitry 52 may be configured to perform various functionality described herein. For example, computer instructions may be stored in memory 56 and/or another computer-readable medium that, when executed by processor 54, causes the processor 54 to perform various functionality described herein.

Hardware 50 may include communication interface 60 facilitating communication between control device 24 and one or more elements in system 10. For example, communication interface 60 may be configured for establishing and maintaining at least a wireless or wired connection with one or more elements of system 10 such as premises device 26 or computing environment 14 or robot 16 or robot base station 20.

Control device 24 further has software 80 (which may include one or more software applications) stored internally in, for example, memory 56, or stored in external memory (e.g., database, storage array, network storage devices, etc.) accessible by the control device 24 via an external connection. Software 80 may include any software or program that configures processing circuitry 52 to perform the steps or processes of the present disclosure.

The processing circuitry 52 may be configured to control any of the methods and/or processes described herein and/or to cause such methods, and/or processes to be performed, e.g., by control device 24. Processor 54 corresponds to one or more processors 54 for performing control device 24 functions described herein. The memory 56 is configured to store data and/or files such as remote monitoring computing environment data and/or other information/data. In some embodiments, the software 80 may include instructions that, when executed by the processor 54 and/or processing circuitry 52, causes the processor 54 and/or processing circuitry 52 to perform the processes described herein with respect to control device 24. Accordingly, by having computer instructions stored in memory 56 accessible to the processor 54, the processor 54 may be configured to perform the actions described herein.

Figure 3:
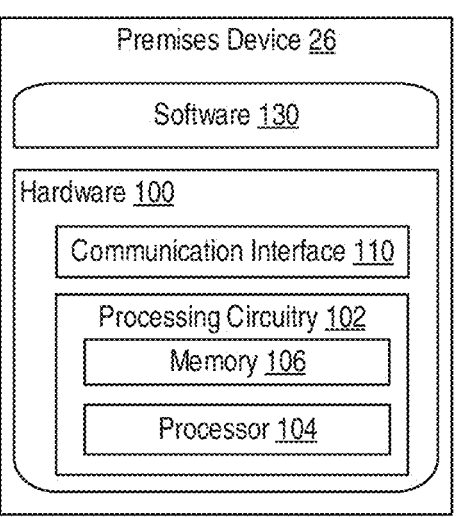
FIG. 3 is a block diagram of an example premises device of the system of FIG. 1 according to various embodiments of the present disclosure.

FIG. 3 is a block diagram illustrating an example premises device 26 of premises monitoring system 12. As shown, premises device 26 comprises hardware 100. The hardware 100 may include processing circuitry 102. The processing circuitry 102 may include one or more processors 104 and one or more memories 106. Each processor 104 may include and/or be associated with one or more central processing units, data buses, buffers, and interfaces to facilitate operation. In addition to or instead of a processor 104 and memory 106, the processing circuitry 102 may comprise other types of integrated circuitry that performs various functionality. Integrated circuitry may include one or more processors 104, processor cores, FPGAs, ASICs, GPUs, SoCs, or other components configured to execute instructions. The processor 64 may be configured to access (e.g., write to and/or read from) the memory 106, which may comprise any kind of volatile and/or nonvolatile memory, e.g., cache, buffer memory, RAM, ROM, optical memory, and/or EPROM. Further, memory 106 may be embodied in the form of one or more storage devices. The processing circuitry may be configured to perform various functionality described herein. For example, computer instructions may be stored in memory 106 and/or another computer-readable medium that, when executed by processor 104, causes the processor 104 to perform various functionality such as, for example, generating sensor data indicative of a fluid leak.

Hardware 100 may include communication interface 110 facilitating communication between premises device 26 and one or more elements in system 10. For example, communication interface 110 may be configured for establishing and maintaining at least a wireless or wired connection with one or more elements of system 10 such as control device 24 or computing environment 14 or robot 16 or robot base station 20.

Premises device 26 further has software 130 (which may include one or more software applications) stored internally in, for example, memory 106, or stored in external memory (e.g., database, storage array, network storage devices, etc.) accessible by the premises device 26 via an external connection. Software 130 may include any software or program that configures processing circuitry 102 to perform the steps or processes of the present disclosure.

The processing circuitry 102 may be configured to control any of the methods and/or processes described herein and/or to cause such methods, and/or processes to be performed, e.g., by premises device 26. Processor 104 corresponds to one or more processors 104 for performing premises device 26 functions described herein. The memory 106 is configured to store data and/or files, such as remote monitoring computing environment data and/or other information/data. In some embodiments, the software 130 may include instructions that, when executed by the processor 104 and/or processing circuitry 102, causes the processor 104 and/or processing circuitry 102 to perform the processes described herein with respect to premises device 26. Accordingly, by having computer instructions stored in memory 106 accessible to the processor 104, the processor 104 may be configured to perform the actions described herein.

Figure 4:
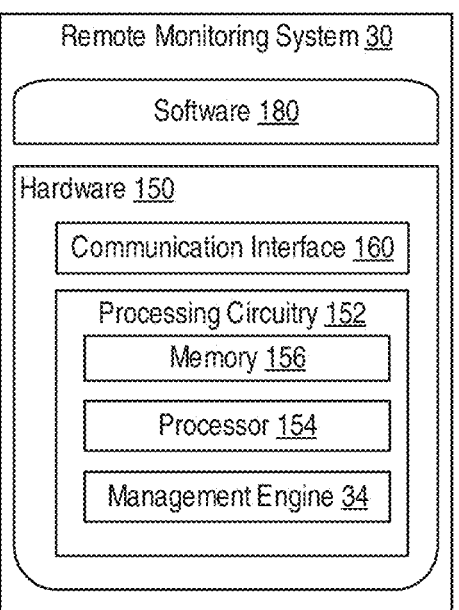
FIG. 4 is a block diagram of an example remote monitoring system of the system of FIG. 1 according to various embodiments of the present disclosure.

FIG. 4 is a block diagram illustrating an example remote monitoring system 30 of computing environment 14. The remote monitoring system 30 may be provided by one or more servers. According to various embodiments, the servers can be located in a single geographical location (e.g., a datacenter) or distributed across multiple geographic locations. In some embodiments, the servers can operate as part of an elastic computing resource in which the allotted capacity of computing-related resources may vary over time.

As shown, remote monitoring system 30 comprises hardware 150. The hardware 150 may include processing circuitry 152. The processing circuitry 152 may include one or more processors 154 and one or more memories 106. Each processor 154 may include and/or be associated with one or more central processing units, data buses, buffers, and interfaces to facilitate operation. In addition to or instead of a processor 154 and memory 156, the processing circuitry 152 may comprise other types of integrated circuitry that performs various functionality. Integrated circuitry may include one or more processors 154, processor cores, FPGAs, ASICs, GPUs, SoCs, or other components configured to execute instructions. The processor 64 may be configured to access (e.g., write to and/or read from) the memory 156, which may comprise any kind of volatile and/or nonvolatile memory, e.g., cache, buffer memory, RAM, ROM, optical memory, and/or EPROM. Further, memory 156 may be embodied in the form of one or more storage devices. The processing circuitry may be configured to perform various functionality described herein. For example, computer instructions may be stored in memory 156 and/or another computer-readable medium that, when executed by processor 154, causes the processor 154 to perform various functionality.

Hardware 150 may include communication interface 160 facilitating communication between remote monitoring system 30 and one or more elements in system 10. For example, communication interface 160 may be configured for establishing and maintaining at least a wireless or wired connection with one or more elements of system 10 such as control device 24, premises device 26, data store 32, robot 16, or robot base station 20.

Remote monitoring system 30 further has software 180 (which may include one or more software applications) stored internally in, for example, memory 106, or stored in external memory (e.g., database, storage array, network storage devices, etc.) accessible by the remote monitoring system 30 via an external connection. Software 180 may include any software or program that configures processing circuitry 152 to perform the steps or processes of the present disclosure.

The processing circuitry 152 may be configured to control any of the methods and/or processes described herein and/or to cause such methods, and/or processes to be performed, e.g., by remote monitoring system 30. Processor 154 corresponds to one or more processors 154 for performing remote monitoring system 30 functions described herein. The memory 156 is configured to store data and/or files such as remote monitoring computing environment data and/or other information/data. In some embodiments, the software 180 may include instructions that, when executed by the processor 154 and/or processing circuitry 152, causes the processor 154 and/or processing circuitry 152 to perform the processes described herein with respect to remote monitoring system 30. Accordingly, by having computer instructions stored in memory 156 accessible to the processor 154, the processor 154 may be configured to perform the actions described herein.

Figure 5:
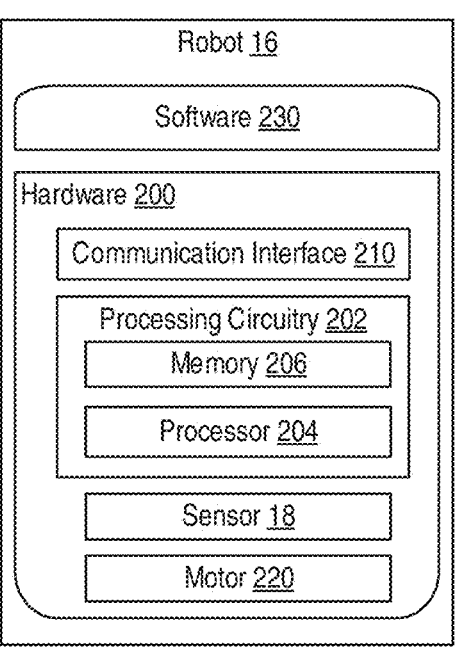
FIG. 5 is a block diagram of an example robot of the system of FIG. 1 according to various embodiments of the present disclosure.

FIG. 5 shows a block diagram illustrating portions of an example robot 16 of system 10. As shown, robot 16 comprises hardware 200. The hardware 200 may include processing circuitry 202. The processing circuitry 202 may include one or more processors 204 and one or more memories 206. Each processor 204 may include and/or be associated with one or more central processing units, data buses, buffers, and interfaces to facilitate operation. In addition to or instead of a processor 204 and memory 206, the processing circuitry 202 may comprise other types of integrated circuitry that perform various functionality. Integrated circuitry may include one or more processors 204, processor cores, FPGAs, ASICs, GPUs, SoCs, or other components configured to execute instructions. The processor 64 may be configured to access (e.g., write to and/or read from) the memory 206, which may comprise any kind of volatile and/or nonvolatile memory, e.g., cache, buffer memory, RAM, ROM, optical memory, and/or EPROM. Further, memory 206 may be embodied in the form of one or more storage devices. The processing circuitry 202 may be configured to perform various functionality described herein. For example, computer instructions may be stored in memory 206 and/or another computer-readable medium that, when executed by processor 204, causes the processor 204 to perform various functionality.

Hardware 200 may include communication interface 210 facilitating communication between robot 16 and one or more elements in system 10. For example, communication interface 210 may be configured for establishing and maintaining at least a wireless or wired connection with one or more elements of system 10 such as control device 24, premises device 26, computing environment 14, or robot base station 20.

Robot 16 further has software 230 (which may include one or more software applications) stored internally in, for example, memory 206, or stored in external memory (e.g., database, storage array, network storage devices, etc.) accessible by the robot 16 via an external connection. Software 230 may include any software or program that configures processing circuitry 202 to perform the steps or processes of the present disclosure.

The processing circuitry 202 may be configured to control any of the methods and/or processes described herein and/or to cause such methods, and/or processes to be performed, e.g., by robot 16. Processor 204 corresponds to one or more processors 204 for performing robot 16 functions described herein. The memory 206 is configured to store data and/or files such as remote monitoring computing environment data and/or other information/data. In some embodiments, the software 230 may include instructions that, when executed by the processor 204 and/or processing circuitry 202, causes the processor 204 and/or processing circuitry 202 to perform the processes described herein with respect to robot 16. Accordingly, by having computer instructions stored in memory 206 accessible to the processor 204, the processor 204 may be configured to perform the actions described herein.

Robot 16 includes sensor 18 (which may include a plurality of sensors 18). Sensor 18 may be configured to detect the presence of a fluid, characteristics of the fluid, etc. For example, sensor 18 may be configured to detect whether water is on the floor of a premises. In some embodiments, sensor 18 may comprise electrodes, electrically conductive brush bristles, a water sensor couplable to a movable arm, or any other type of sensor.

Robot 16 may also include motor 220 (which may include a plurality of motors 220). Motor 220 may be configured to cause robot 16 to traverse at least a portion of the premises, for example, in response to control signaling received from processing circuitry 202 of robot 16. Further, motor 220 may be configured to actuate and/or move components of robot 16 such sensor 18, arms, wheels, etc.

Figure 6:
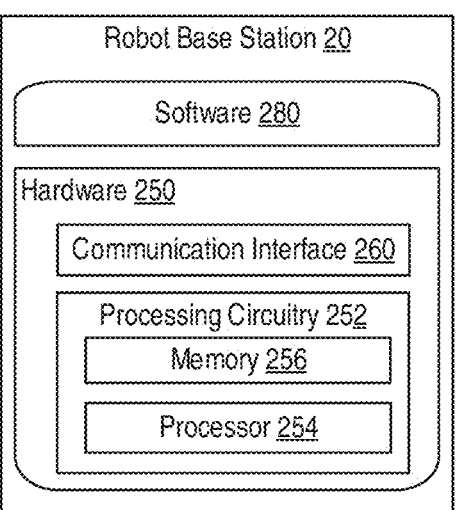
FIG. 6 is a block diagram of an example robot base station of the system of FIG. 1 according to various embodiments of the present disclosure.

FIG. 6 shows a block diagram illustrating an example robot base station 20 of system 10. As shown, robot base station 20 comprises hardware 250. The hardware 250 may include processing circuitry 252. The processing circuitry 252 may include one or more processors 254 and one or more memories 256. Each processor 254 may include and/or be associated with one or more central processing units, data buses, buffers, and interfaces to facilitate operation. In addition to or instead of a processor 254 and memory 256, the processing circuitry 252 may comprise other types of integrated circuitry that perform various functionality. Integrated circuitry may include one or more processors 254, processor cores, FPGAs, ASICs, GPUs, SoCs, or other components configured to execute instructions. The processor 254 may be configured to access (e.g., write to and/or read from) the memory 256, which may comprise any kind of volatile and/or nonvolatile memory, e.g., cache, buffer memory, RAM, ROM, optical memory, and/or EPROM. Further, memory 256 may be embodied in the form of one or more storage devices. The processing circuitry 252 may be configured to perform various functionality described herein. For example, computer instructions may be stored in memory 256 and/or another computer-readable medium that, when executed by processor 254, causes the processor 254 to perform various functionality.

Hardware 250 may include communication interface 260 facilitating communication between robot base station 20 and one or more elements in system 10. For example, communication interface 260 may be configured for establishing and maintaining at least a wireless or wired connection with one or more elements of system 10 such as control device 24, premises device 26, computing environment 14, or robot 16.

Robot base station 20 further has software 280 (which may include one or more software applications) stored internally in, for example, memory 256, or stored in external memory (e.g., database, storage array, network storage devices, etc.) accessible by the robot base station 20 via an external connection. Software 280 may include any software or program that configures processing circuitry 252 to perform the steps or processes of the present disclosure.

The processing circuitry 252 may be configured to control any of the methods and/or processes described herein and/or to cause such methods, and/or processes to be performed, e.g., by robot base station 20. Processor 254 corresponds to one or more processors 254 for performing robot base station 20 functions described herein. The memory 256 is configured to store data and/or files such as remote monitoring computing environment data and/or other information/data. In some embodiments, the software 280 may include instructions that, when executed by the processor 254 and/or processing circuitry 252, causes the processor 254 and/or processing circuitry 252 to perform the processes described herein with respect to robot base station 20. Accordingly, by having computer instructions stored in memory 256 accessible to the processor 254, the processor 254 may be configured to perform the actions described herein.

Figure 7:
FIG. 7 shows a front view of an example robot including various sensors according to various embodiments of the present disclosure.
Figure 7:
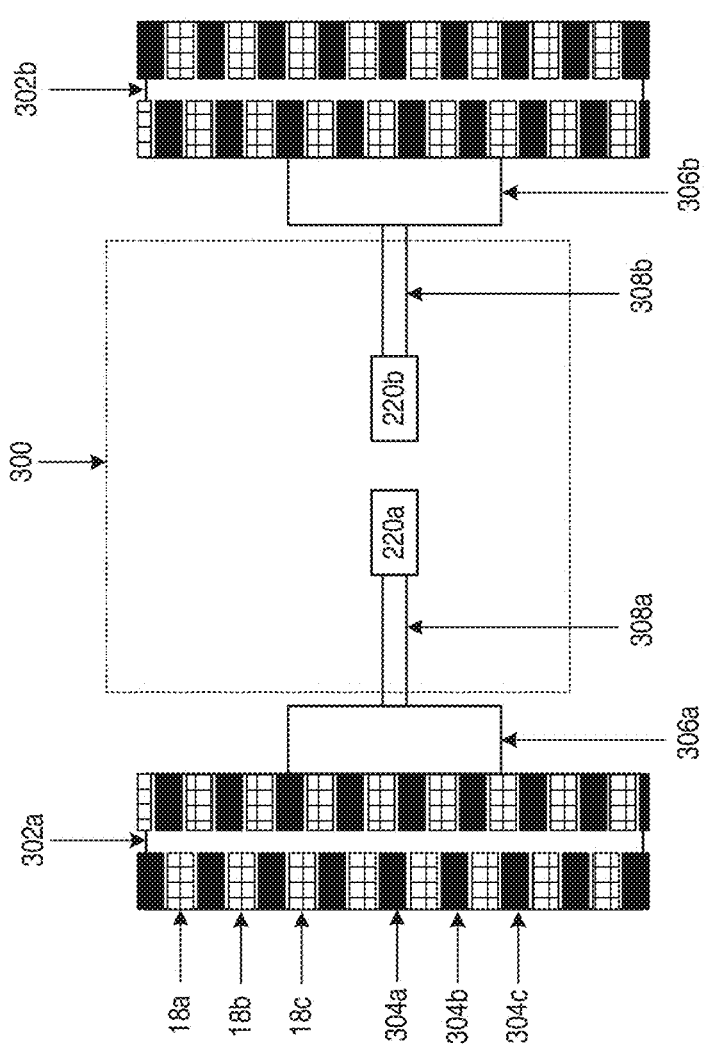

In some embodiments, sensor 18 can be positioned on a robot 16 to facilitate sensor 18 making contact with the floor while robot 16 is stationary and/or in motion. FIG. 7 shows a front view of an example robot 16 including various sensors 18 on the wheels 302 of the robot 16 according to various embodiments of the present disclosure. More specifically, robot 16 includes a body 300, wheels 302a, 302b (collectively referred to as wheels 302), wheel surfaces 304a, 304b, 304c (collectively referred to as wheel surfaces 304), hubs 306a, 306b (collectively referred to as hubs 306), axles 308a, 308b (collectively referred to as axles 308), and motors 220a, 220b (collectively referred to as motors 220). Robot 16 may include additional wheels 302 (such as wheels 302c, 302d not shown in FIG. 7). Wheels 302 may include sensors 18a, 18b, 18c (collectively referred to as sensors 18). Further, sensors 18 may be separated by wheel surfaces 304 (e.g., rubber tread). That is, sensors 18 may be arranged such that each sensor 18 is not in physical contact with another sensor 18 (e.g., when not in contact with a fluid). Motors 220 may be coupled to axle 308. Axle 308 may be coupled to hub 306, which is coupled to wheel 302. Motors 220 may be electrical motors arranged to initiate motion of robot 16 by causing wheels 302 (and their sensors 18) to rotate about the axis of the axles 308. Motors 220 may be arranged to provide motion to other components of robot 16. Body 300 may be arranged to house other components of robot 16 such as processing circuitry 202 which may be in communication with sensors 18, e.g., electrically coupled to sensors 18.

Figure 8:
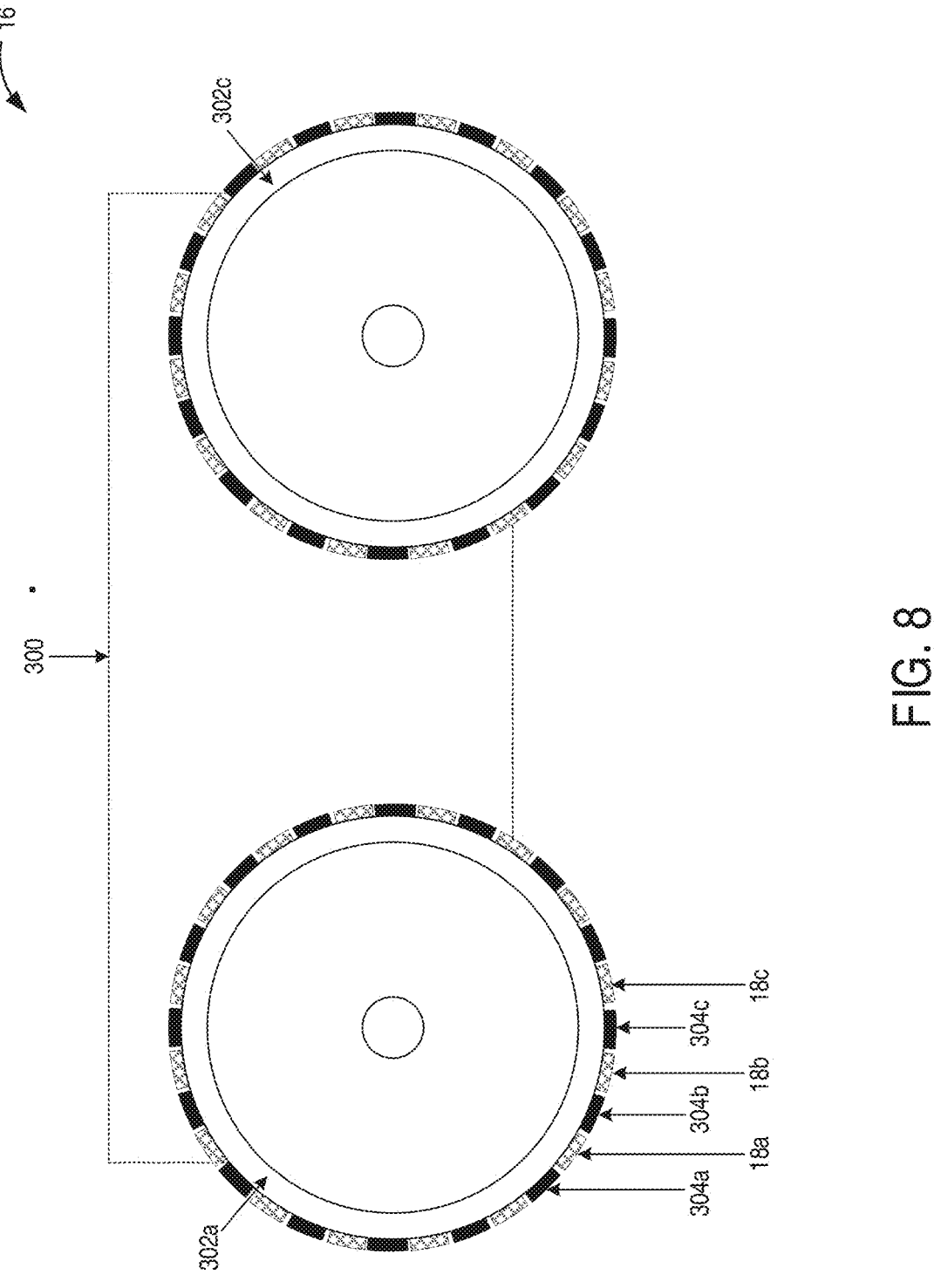
FIG. 8 shows a side view of the example robot including various sensors according to various embodiments of the present disclosure.

FIG. 8 shows a side view of the example robot 16 including various sensors 18 on the wheels 302 according to various embodiments of the present disclosure. The example robot 16 may include four wheels 302, although two wheels are shown for ease of understanding. More specifically, a side of robot 16 is shown, including wheel 302a (shown in FIG. 7) and wheel 302c (not shown in FIG. 7). Each wheel 302 may include a plurality of sensors 18, such as sensors 18a, 18b 18c, separated by wheel surfaces 304, 304b, 304c as shown.

In some embodiments, sensors 18 are electrodes which may be arranged in pairs (e.g., sensors 18a, 18b) to detect the presence of a liquid. The electrodes are preconfigured in an open state such that there is an electrical discontinuity between the electrodes when not exposed to a conductive fluid. For example, when the electrodes are dry, there is an open circuit across the electrodes as there is no electrically conductive fluid to electrically connect the at least two electrodes to each other. When the pair of electrodes are in contact with the liquid, the electroconductivity of the liquid creates a short circuit between the electrodes, i.e., electrically connects the electrodes. Robot 16 may be configured to measure the resistance or voltage across the electrodes (or current flowing through the electrodes) to determine whether water (or another electroconductive liquid) is present at the robot 16's location. Although pairs of sensors 18 have been described, the present disclosure is not limited as such, and any other combinations of sensors 18 may be used.

In some other embodiments, robot 16 may move within an interior environment of a premises and is capable of navigating within the interior environment. As robot 16 moves and wheels 302 rotate, pairs of sensors 18 may make contact with the floor. When a pair of sensors 18 makes contact with a liquid, robot 16 detects a short circuit between the pair of sensors 18 and in response to the detection of the short circuit, robot 16 determines the presence of the liquid. As robot 16 continues to travel and detect the presence of the liquid, robot 16 may determine one or more characteristics of the presence of the liquid. For example, robot 16 may determine the size and/or shape formed by the liquid on the floor and detect other characteristics of the liquid. For example, robot 16 may determine the shape and size of a puddle of liquid based on revolutions (or fraction of revolutions) of wheels 302. In some embodiments, both sensors 18 of the pair of sensors 18 used to detect a short are not in the same wheel 302. That is, a first sensor 18 may be in a first wheel 302, while a second sensor is in a second wheel 302. The first and second sensors 18 may be used to determine presence of the liquid.

In some embodiments, sensor 18 may be configured to determine at least one characteristic of the liquid, and robot 16 may determine a specific liquid is present based on the at least one characteristic. In some other embodiments, robot 16 determines that a liquid has been detected by sensors 18 of a wheel 302, while the sensors 18 of other wheels 302 have not detected the liquid. Robot 16 may cause one or more wheels 302 to rotate, causing the other wheels 302 to contact the liquid and determine the size or area of the liquid on the floor. For example, the size or area of the liquid may be determined based on revolutions (or fraction of revolutions) of a wheel 302. The revolutions or fraction of revolutions may be determined using a rotation sensor (included in the robot 16 or any of its components). The rotation sensor may measure how much the axle 308 rotates, which may be based on rotation counts or an analog value. There may be a plurality of rotation counts in a revolution, e.g., 10 counts may represent an entire revolution, and one count represents ⅒ of a revolution. By using the circumference of the wheel 302 and measuring how much the axle 308 rotates, the distance that wheel 302 has traveled may be determined. Robot 16 may further refine the size or area determination by using the distance traveled by each wheel 302, whether steering was used, degrees of steering, etc.

Figures 9, 10:
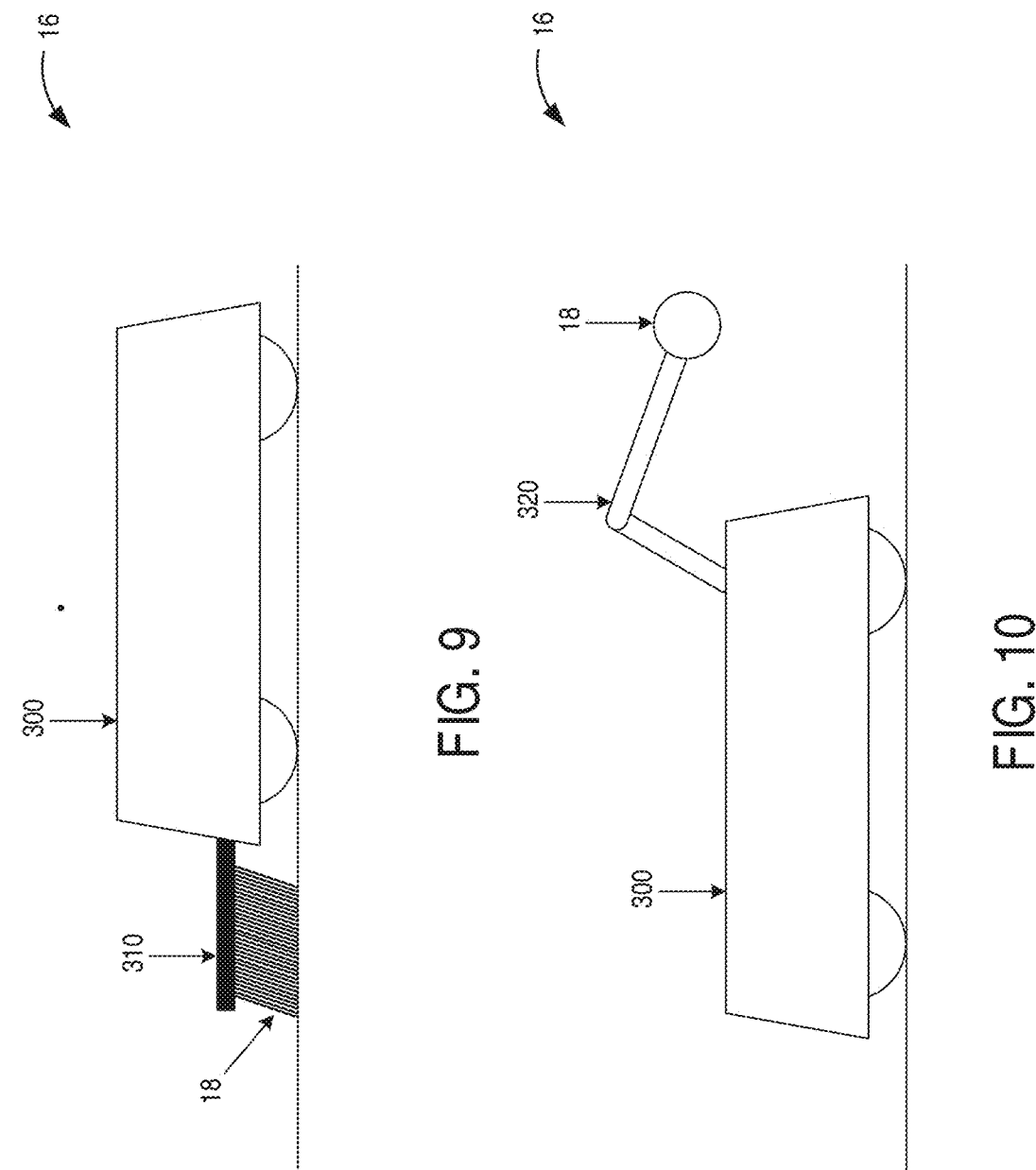
FIG. 9 shows another example robot including various sensors according to various embodiments of the present disclosure.
FIG. 10 shows another example robot including an arm and a sensor according to various embodiments of the present disclosure.

FIG. 9 shows another example robot 16 including various sensors 18 according to various embodiments of the present disclosure. More specifically, robot 16 may include a plurality of sensors 18. Sensors 18 may be electrically conductive brush bristles that may make physical contact with the floor while robot 16 travels, e.g., the electrically conductive brush bristles may be dragged on the floor. Sensors 18 may be coupled to sensor support 310 and spaced at a predetermined distance at sensor support 310 such that when sensors 18 are in physical contact with the floor, they are separated by a distance proportional to the predetermined distance. At least two of the electrically conductive brush bristles may be preconfigured to form an open circuit such that the at least two of the electrically conductive brush bristles are not in electrical communication with each other when not in contact with a conductive liquid. However, the at least two of the electrically conductive brush bristles may be placed in electrical communication with each other (i.e., electrically shorted) when in contact with an electrically conductive liquid. In some embodiments, sensor support 310 is coupled to a side (e.g., rear side) of body 300. Although sensor 18 is shown in the rear of body 300, the embodiments are not limited as such, and sensor 18 may be located on any other portion of robot 16, such as on the underside of the body 300, etc.

FIG. 10 shows another example robot including an arm 320 and a sensor 18 according to various embodiments of the present disclosure. More specifically, sensor 18 may be releasably coupled to an arm 320. The arm 320 may be an articulating arm and may be retracted such as via a motor 220. For example, arm 320 may be retracted or extended while robot 16 travels. Arm 320 may be moved into at least a sampling position. For example, the arm 320 and sensor 18 may be retracted while the robot 16 travels to an area where there is a suspected water leak and then positioned to place the sensor 18 in contact or in proximity with the floor once the robot 16 has reached the area. The arm 320 may also be used to place the sensor 18 in locations that are otherwise difficult to reach. For example, the arm 320 may be used to place the sensor 18 under a refrigerator, behind a toilet, under a cabinet, against a wall, on a water pipe, etc. In some embodiments, other types of sensors 18, such as a proximity sensor, a camera, a radar sensor, etc., may also be mounted to arm 320. Combining different types of sensors 18 may allow robot 16 to determine where objects are located relative to robot 16 and the water sensors, and to move the water sensor 18 around objects. In some other embodiments, moving arm 320 and sensor 18 facilitate determining the characteristics of the fluid.

Figure 11A:
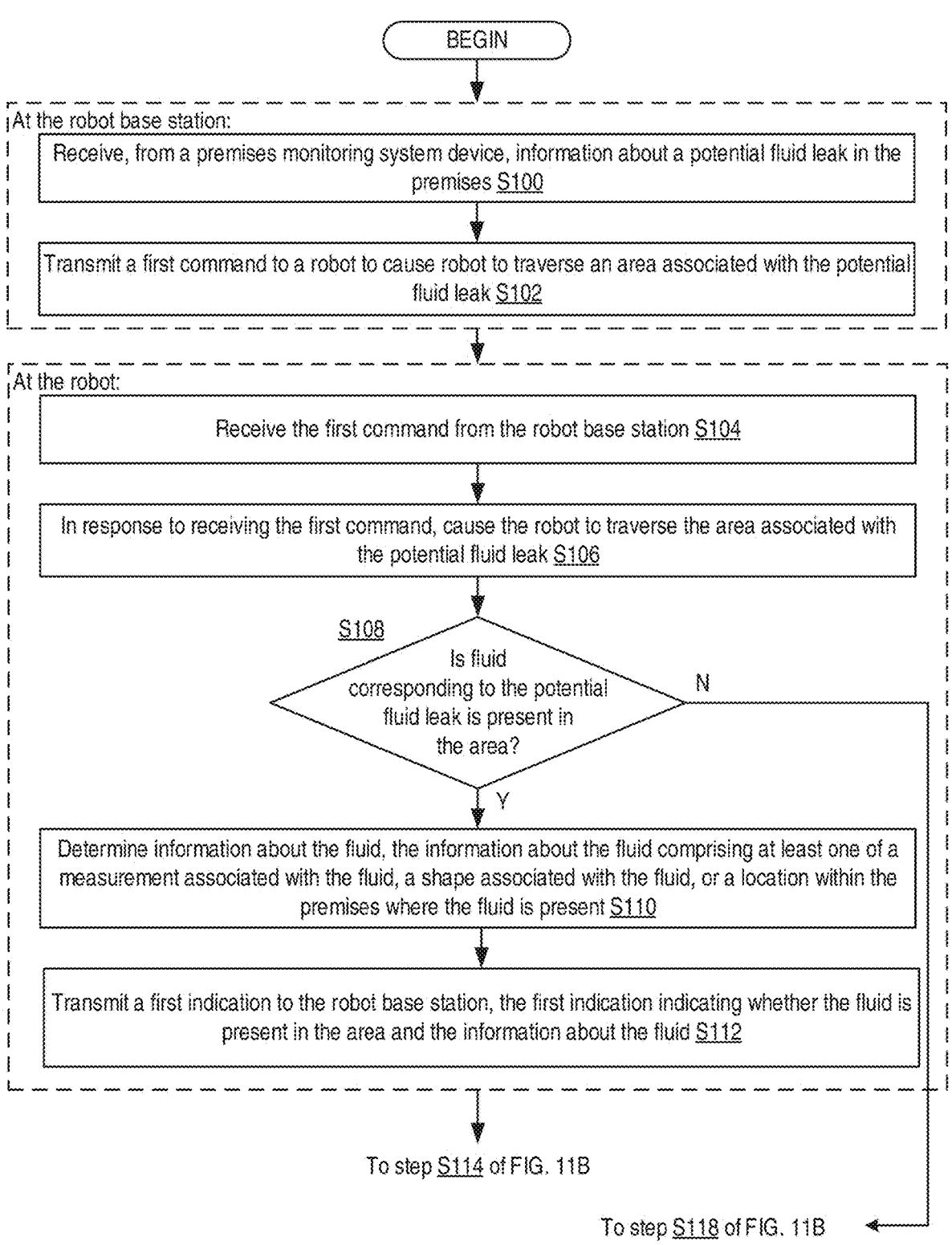
FIG. 11A is a flowchart of example functionality performed by components of the system of FIG. 1 according to some embodiments of the present disclosure.

FIGS. 11A-B are a flow diagram of an example process and/or method performed by components of system 10 (e.g., robot 16, robot base station 20, premises monitoring system 12, its components, computing environment 14 and its components, etc.). Referring to FIG. 11A, robot base station 20 receives (Block S100), from a premises monitoring system device or the remote monitoring system 30, information about a potential fluid leak in the premises and transmits (Block S102) a first command to the robot 16 to cause the robot 16 to traverse an area associated with the potential fluid leak. Further, robot 16 receives (Block S104) the first command from the robot base station 20, in response to receiving the first command, causes (Block S106) the robot 16 to traverse the area associated with the potential fluid leak, and determines (Block S108), using the at least one sensor 18, that fluid corresponding to the potential fluid leak is present in the area. If the fluid is present in the area, robot 16 determines (Block S110) information about the fluid. The information about the fluid comprises at least one of a measurement associated with the fluid, a shape associated with the fluid, or a location within the premises where the fluid is present. The measurement associated with the fluid may include dimension measurements, content measurements which may facilitate identification of the type of fluid, detection of fluid characteristics such as viscosity, state of the fluid, color, etc. Robot 16 transmits (Block S112) a first indication to the robot base station 20. The first indication indicates that the fluid is present in the area and the information about the fluid.

Referring to FIG. 11B, robot base station 20 receives (Block S114) the first indication from the robot 16 and determines (Block S116), based on the first indication, the fluid corresponding to the potential fluid leak is present in the area. Robot base station 20, if the fluid is not present in the area or a predetermined period of time has elapsed without the robot 16 detecting the presence of the fluid, transmits (Block S118) a second command to the robot 16, the second command triggering the robot 16 to return to the robot base station 20. Robot base station 20 transmits (Block S120) a second indication to the premises monitoring system 12 or the remote monitoring system 30. The second indication indicates whether the fluid corresponding to the potential fluid leak is present in the area and the information about the fluid.

In some embodiments, the at least one sensor 18 includes a plurality of electrodes arranged to detect a presence of a fluid.

In some other embodiments, each electrode of the plurality of electrodes is not in physical contact with any other electrode of the plurality of electrodes.

In some embodiments, the robot 16 is configured to detect a short-circuit condition across at least a pair of electrodes of the plurality of electrodes, when the pair of electrodes contacts the fluid and, in response to detecting the short-circuit condition, determines that the fluid is present in the area of the premises.

In some other embodiments, the robot 16 further comprises at least a wheel 302. The wheel 302 comprises a wheel surface 304. At least a first group of electrodes of the plurality of electrodes is coupled the wheel surface 304.

In some embodiments, the robot 16 further at least a subset of the plurality of electrodes form a plurality of conductive bristles. In some embodiments, the robot 16 comprises an articulating arm 320. The sensor 18 is coupled to the articulating arm 320. The sensor 18 may be configured to detect the presence of the fluid by making contact with the fluid or by being within a predetermined distance from the fluid.

In some other embodiments, the robot 16 is configured to receive (e.g., from the premises monitoring system or the remote monitoring system) information about the potential fluid leak being present in the area of the premises, and, in response to receiving the information, cause the robot 16 to traverse the area associated with the potential fluid leak. Causing the robot 16 to traverse may include setting the robot 16 in motion.

In some embodiments, the system 10 further includes a robot base station 20, and the robot 16 is configured to dock at the robot base station 20.

In some other embodiments, the robot 16 is configured to, if the fluid is not present in the area or a predetermined period of time has elapsed without the robot detecting the presence of the fluid, cause the robot 16 to return to and dock at the robot base station 20.

In some embodiments, the system 10 further comprises the premises monitoring system 12, which includes a premises device 26. The premises device 26 is configured to detect the potential fluid leak or, in response to receiving one or more indications from the robot 16 or the robot base station 20, perform the fluid leak mitigation actions including corroborating that the fluid is present in the area.

In some other embodiments, the premises monitoring system 12 further comprises a control device 24, which is a valve configured to perform the fluid leak mitigation actions. The valve operates in response to receiving the one or more indications from the robot 16 or the robot base station 20. For example, the valve may be a shutoff valve that stops fluid from flowing and from causing the fluid leak.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A premises monitoring system, comprising:
a robot comprising:
    at least one wheel, the at least one wheel comprising at least one sensor, the at least one sensor comprising a plurality of electrodes arranged to detect a presence of a fluid;
    at least one processor in communication with the at least one sensor; and
    at least one memory storing a plurality of instructions that, when executed by the at least one processor, causes the at least one processor to:
        determine, using the at least one sensor, that a fluid corresponding to a detected potential fluid leak is present in an area of a premises;
        in response to determining that the fluid is present in the area of the premises, determine information about the fluid; and
        cause transmission of the information to a control device for the premises monitoring system.

2. The premises monitoring system of claim 1, wherein the information about the fluid comprises at least one of a measurement associated with the fluid, a shape associated with the fluid, or a location within the premises where the fluid is present.

3. The premises monitoring system of claim 1, wherein each electrode of the plurality of electrodes is not in physical contact with any other electrode of the plurality of electrodes.

4. The premises monitoring system of claim 1, wherein the plurality of instructions are further configured to cause the at least one processor to:
    detect a short-circuit condition across at least a pair of electrodes of the plurality of electrodes, when the pair of electrodes contacts the fluid; and
    in response to detecting the short-circuit condition, determine that the fluid is present in the area.

5. The premises monitoring system of claim 1, wherein the plurality of instructions are further configured to cause the at least one processor to:
    receive information about the detected potential fluid leak being present in the area of the premises; and
    in response to receiving the information, cause the robot to traverse at least a portion of the area of the premises.

6. The premises monitoring system of claim 1, wherein the at least one wheel comprises at least a first wheel and a second wheel.

7. The premises monitoring system of claim 6, wherein the plurality of electrodes comprises:
    a first group of electrodes positioned on the first wheel; and
    a second group of electrodes positioned on the second wheel.

8. The premises monitoring system of claim 7, wherein:
    the first wheel comprises a first wheel surface, the first group of electrodes being coupled to the first wheel surface; and
    the second wheel comprises a second wheel surface, the second group of electrodes being coupled to the second wheel surface.

9. The premises monitoring system of claim 7, wherein the plurality of instructions are further configured to cause the at least one processor to:
    cause at least one of the first wheel or the second wheel to rotate;
    in response to a rotation of at least one of the first wheel or the second wheel, at least one of:
        determine that the fluid corresponding to the detected potential fluid leak is present in the area of the premises; or
        determine the information about the fluid.

10. The premises monitoring system of claim 9, wherein the information is determined based at least in part on revolution information associated with the rotation of at least one of the first wheel or the second wheel.

11. The premises monitoring system of claim 9, wherein the information is determined based at least in part on an amount of degrees of steering that is performed using at least one of the first wheel or the second wheel.

12. The premises monitoring system of claim 1, wherein the at least one wheel comprises a plurality of wheels, each of the plurality of wheels comprising a respective group of the plurality of electrodes arranged to detect the premises of the fluid.

13. A method in a premises monitoring system comprising a robot, the robot comprising at least one wheel, the at least one wheel comprising at least one sensor, the at least one sensor comprising a plurality of electrodes arranged to detect a presence of a fluid, the method comprising:
    determining, using the at least one sensor, that a fluid corresponding to a detected potential fluid leak is present in an area of a premises;
    in response to determining that the fluid is present in the area of the premises, determining information about the fluid; and
    transmitting the information to a control device for the premises monitoring system.

14. The method of claim 13, wherein the information about the fluid comprises at least one of a measurement associated with the fluid, a shape associated with the fluid, or a location within the premises where the fluid is present.

15. The method of claim 13, wherein each electrode of the plurality of electrodes is not in physical contact with any other electrode of the plurality of electrodes.

16. The method of claim 13, further comprising:
    detecting a short-circuit condition across at least a pair of electrodes of the plurality of electrodes, when the pair of electrodes contacts the fluid; and
    in response to detecting the short-circuit condition, determining that the fluid is present in the area.

17. The method of claim 13, further comprising:
receiving information about the detected potential fluid
leak being present in the area of the premises; and
in response to receiving the information, causing the robot
to traverse at least a portion of the area of the premises. 5
18. The method of claim 13, wherein the at least one
wheel comprises at least one of a first wheel and a second
wheel; and
the plurality of electrodes comprises:
a first group of electrodes positioned on the first wheel; 10
and
a second group of electrodes positioned on the second
wheel.
19. The method of claim 18, wherein:
the first wheel comprises a first wheel surface, the first 15
group of electrodes being coupled to the first wheel
surface; and
the second wheel comprises a second wheel surface, the
second group of electrodes being coupled to the second
wheel surface. 20
20. The method of claim 18, further comprising:
causing at least one of the first wheel or the second wheel
to rotate;
in response to a rotation of at least one of the first wheel
or the second wheel, at least one of: 25
determine that the fluid corresponding to the detected
potential fluid leak is present in the area of the
premises; or
determine the information about the fluid.

\* \* \* \* \* 30